United States Patent
Bross et al.

[11] Patent Number: 5,876,072
[45] Date of Patent: Mar. 2, 1999

[54] TUBE CONNECTION IN PARTICULAR FOR CONNECTING TWO TUBULAR ELEMENTS OF THE AIRFRAME OF A MISSILE

[75] Inventors: Dirk Bross; Peter Gerd Fisch, both of Überlingen, Germany

[73] Assignee: Bodenseewerk Geratetechnik GmbH, Überlingen, Germany

[21] Appl. No.: 845,028

[22] Filed: Apr. 21, 1997

[30] Foreign Application Priority Data

Apr. 22, 1996 [DE] Germany .................. 196 15 716.1

[51] Int. Cl.⁶ .................. F16L 25/00; B64C 1/00
[52] U.S. Cl. .................. 285/330; 285/913; 244/131
[58] Field of Search .................. 285/330, 325, 285/327, 90, 18, 913; 244/120, 131; 102/377

[56] References Cited

U.S. PATENT DOCUMENTS

| | | | |
|---|---|---|---|
| 1,639,999 | 8/1927 | Humphreys | 285/330 |
| 2,710,763 | 6/1955 | Gilbert | 285/913 |
| 2,945,704 | 7/1960 | Korn | 285/18 |
| 3,689,113 | 9/1972 | Blaschke | 285/90 |

*Primary Examiner*—Anthony Knight
*Assistant Examiner*—Gary Grafel
*Attorney, Agent, or Firm*—McDermott, Will & Emery

[57] ABSTRACT

In a tube connection, particularly for connecting two tubular elements of the airframe of a substantially tubular a missile, the tubular elements to be interconnected have end portions of substantially identical shapes. Each end portion has a smaller-diameter first circumferential section extending through substantially 180° and a larger-diameter second circumferential section also extending through substantially 180°. The larger-diameter circumferential section of each tubular element overlies the smaller-diameter circumferential section of the other tubular element. The circumferential sections are provided with radial bores for connection screws. Arcuate elements having threaded bores are arranged inside the thus interconnected circumferential sections. These threaded bores are aligned with the radial bores of the circumferential sections and threadedly receive the connecting screws.

12 Claims, 2 Drawing Sheets

TUBE CONNECTION IN PARTICULAR FOR CONNECTING TWO TUBULAR ELEMENTS OF THE AIRFRAME OF A MISSILE

TECHNICAL FIELD

The invention relates to a tube connection for connecting two tubular elements, particularly for connecting two tubular airframe parts of a missile.

BACKGROUND ART

For connecting tubular elements, such as airframe parts of a missile, the prior art provides end portions having different diameters on said tubular elements to be interconnected. These different-diameter end portions are telescoped and are interconnected by radial screws. In order to achieve positive locking, the inner tubular element has to be radially widened and the outer tubular element has to be compressed, when the screws are tightened. This deformation consumes a large amount of the screwing force. The positive locking achieved thereby is poor.

The prior art type of tube connection is particularly unsatisfactory, when tubular elements of the airframe of a highly manoeuverable missiles are interconnected. Here, excessive loads are exerted on the tube connections.

DISCLOSURE OF THE INVENTION

It is the object of the invention to provide a highly stable and highly rigid tube connection.

It is a further object of the invention to provide a highliy stable and rigid but detachable tube connection.

It is a still further object of the invention to provide a tube connection which is easily assembled.

A further object of the invention is to reduce costs and production expenditures, when assembling airframes of tubular missiles.

It is also an object of the invention to provide a small-volume connection of tubular elements of an airframe of missiles.

Another object of the invention is to provide a tube connection leaving a large free cross-sectional area.

A still further object of the invention is to provide a tube connection which results in a smooth outer surface between interconnected tubular elements with no projections extending beyond the cylindrical outer surfaces of the tubular elements.

In order to achieve these and other objects, each of the tubular elements has an end portion to be connected to an end portion of the respective other tubular element Each of these end portions has a first and a second circumferential section with inner and outer diameters. The first circumferential section has a smaller outer diameter than the second circumferential section. The outer diameter of the first circumferential section, less a connection tolerance, is equal to the inner diameter of the second circumferential section. The tubular elements are interconnected by the first circumferential section of each of the tubular elements extending into the second circumferential section of the respective other tubular element. The circumferential sections are provided with radial bores for connection screws.

Arcuate elements having threaded bores are arranged inside the thus interconnected circumferential sections. These threaded bores are aligned with the radial bores of the circumferential sections. Connection screws extend through the radial bores of the circumferential sections and are screwed into the threaded bores of the arcuate elements.

Thus, according to the invention, an "asymmetric radial screw connection" is provided. Such an asymmetric radial screw connection offers the advantage, that the two tubular elements can be freely displaced relative to each other within a small range perpendicular to the separating line of the two circumferential sections. Thereby, there are no radial internal stresses when the elements are screwed together. This permits excellent positive locking. When the asymmetric screw connection is loaded by a bending torque, the force is mainly transferred through the screws.

Further objects and advantages of the invention will become apparent to those skilled in the art when reading the following description of a preferred embodiment of the invention.

BRIEF DESCRIPTION OF THE DRAWINGS

Referring to FIG. 1, numeral 10 designates a first tubular element. The first tubular element 10 shall be connected to a second tubular element 12. The tubular elements 10 and 12 are parts of the tubular airframe of a missile.

Figure 1:
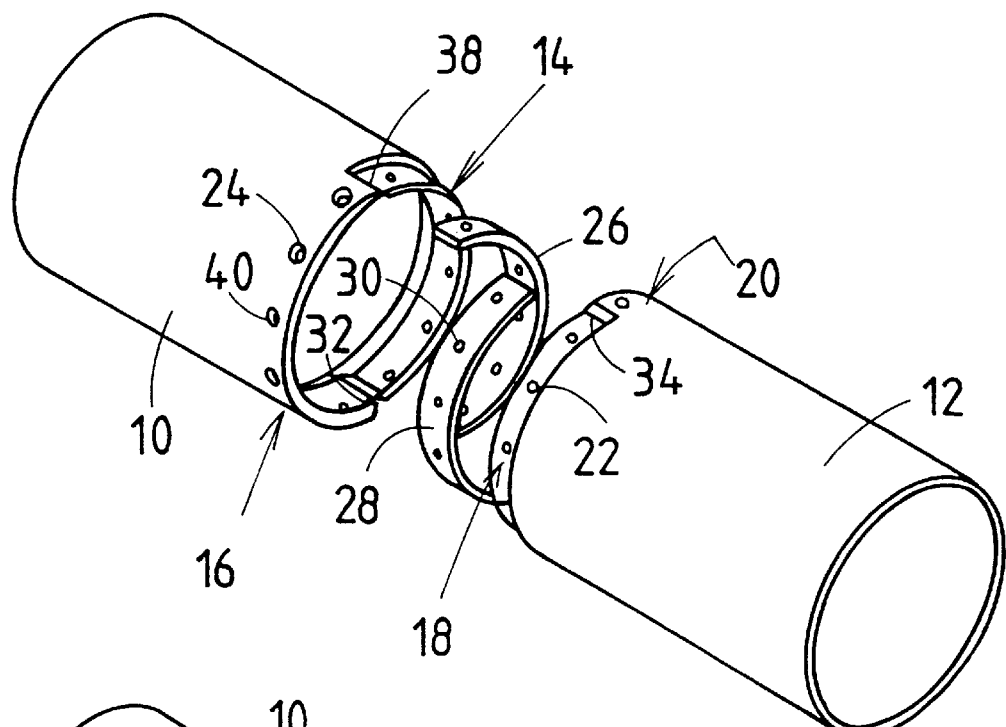
FIG. 1 is an exploded perspective illustration of two tubular elements to be interconnected by an asymmetric screw connection.
Figure 2:
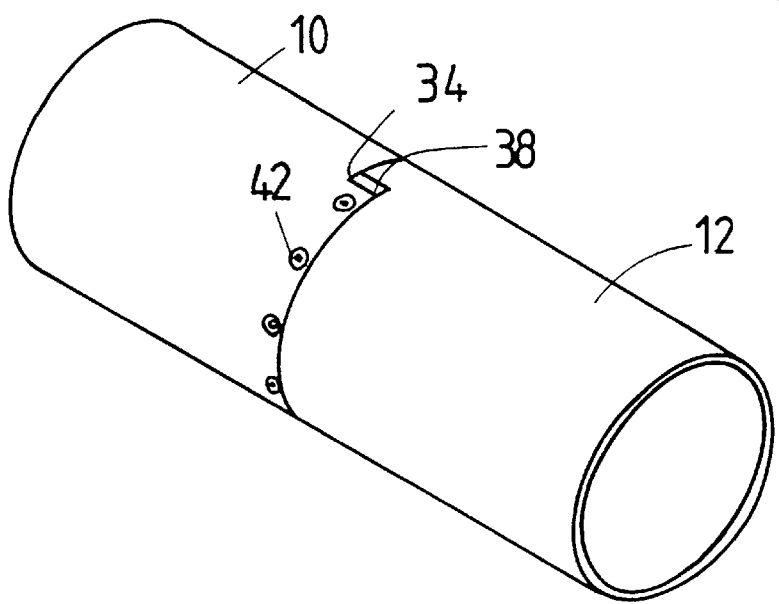
FIG. 2 is a perspective illustration of the two tubular elements in interconnected state.
Figure 3:
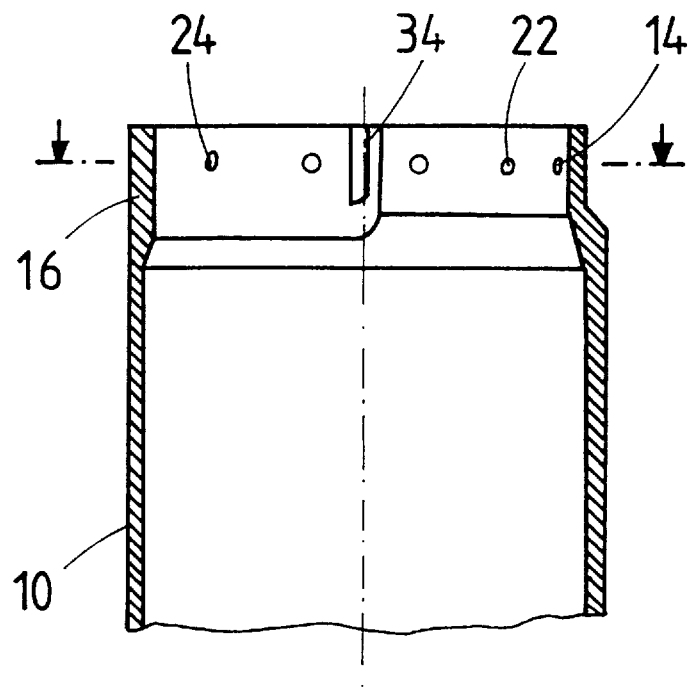
FIG. 3 shows a longitudinal section of an end portion of one of the tubular elements of FIG. 1 and 2.
Figure 4:
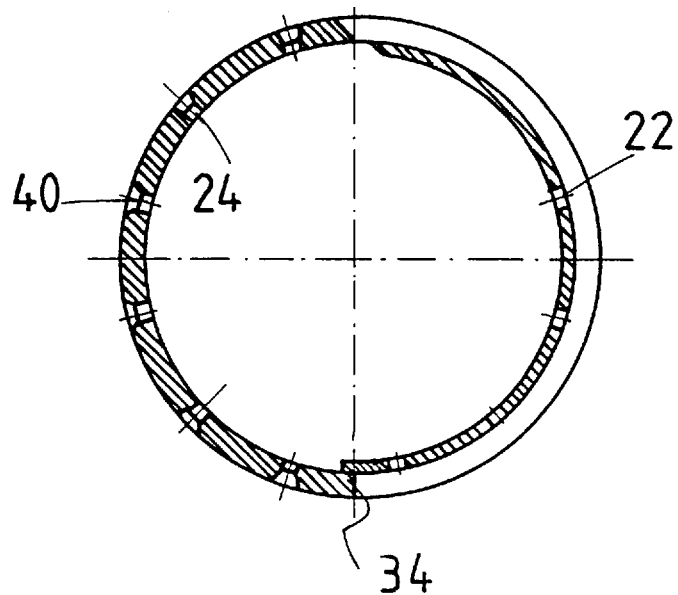
FIG. 4 is a cross sectional view of the end portion of FIG. 3.

The two tubular elements 10 and 12 to be connected have end portions of substantially identical shape. The end portion of tubular element 10 has a first circumferential section 14 and a second circumferential section 16. The diameter of the first circumferential section 14 is smaller than the diameter of the second circumferential section 16. Each of the circumferential sections 14 and 16 extends angularly through about 180°. The outer diameter of the first circumferential section 14 is equal to the inner diameter of the second circumferential section 16 less a connection tolerance. Correspondingly, the end portion of tubular element 12 has a first circumferential section 18 and a second circumferential section 20. The diameter of the first circumferential section 18 is smaller than the diameter of the second circumferential section 20. Each of the circumferential sections 18 and 20 extends angularly through about 180°. The outer diameter of the first circumferential section 18 is equal to the inner diameter of the second circumferential section 20—and of the second circumferential section 16 of tubular element 10—less a connection tolerance. Also the outer diameter of the first circumferential section 14 of tubular element 10 is equal to the inner diameter of the second circumferential section 20 of tubular element 12 less a connection tolerance. The substantially identical end portions of the two tubular elements are interconnected with an angular offset of corresponding elements of 180°, whereby the second circumferential section 16 of the tubular element 10 overlies the first circumferential section 18 of the tubular element 12, and the second circumferential section 20 of the tubular element 12 overlies the first circumferential section 14 of the tubular element 10. The circumferential sections 14, 16, 18 and 20 are provided with radial bores 22 and 24, respectively, for connection screws.

Arcuate elements 26 and 28 having threaded bores 30 are arranged inside the thus interconnected circumferential sections 14, 20 and 18, 16, respectively. The threaded bores 30 are aligned with the radial bores 22 and 24 of the circumferential section 14, 20 and 18, 16, respectively. Each of the arcuate elements 26 and 28 extends through substantially 180°. The arcuate element 26 is located in the area of the circumferential sections 14 and 20. The arcuate element 28 is located in the area of the circumferential sections 18 and 16.

Each of the first circumferential sections 14 and 18 has, circumferentially, a first end and a second end. Each of the second circumferential sections 16 and 20 has, circumferentially, a first end and a second end. The first end of the first circumferential section 14 and 18 of each of the tubular elements 10 and 12, respectively is adjacent the second end of the second circumferential section 16 and 20, respectively. The second end of the first circumferential section 14 and 18 of each of the tubular elements 10 and 12, respectively, is adjacent the first end of the second circumferential section 16 and 20, respectively. An axially extending slot 32 or 34 is defined between each of the first ends of the first circumferential sections 14 and 18, respectively, and the adjacent second ends of the second circumferential sections 16 and 20, respectively. Radial step portions 36 and 38 interconnect the second ends of the first circumferential sections 14 and 18, respectively, and the adjacent first ends of the second circumferential sections 16 and 20, respectively. The radial step portions 36 and 38 extend through the longitudinally extending slots 32 and 34, respectively, when tubular elements 10 and 12 are connected. In the illustrated embodiment, there are two longitudinal slots 32 and 34 and two radial step portions 36 and 38. Radial step portion 38 is diametrically opposite slot 32 in tubular element 10, and radial step portion 36 is diametrically opposite slot 34 in tubular element 12.

The second circumferential sections 16 and 20 having larger outer diameters have counterbores 40 for screw heads 42 on the outer side. These counterbores communicate with the radial bores 24.

We claim:

1. A tube connection for connecting two tubular airframe parts of a missile, wherein
    (a) each of said tubular airframe parts (10,12) has an end portion to be connected to an end portion of the respective other tubular airframe parts (12 and 10, respectively), each of said end portions having a first and second circumferential section (14;18 and 16;20, respectively) with inner and outer diameters, said first circumferential section (14;18) having a smaller outer diameter than said second circumferential section (16;20), said outer diameter of said first circumferential section (14;18), less a connection tolerance, being equal to said inner diameter of said second circumferential section (16;18),
    (b) said tubular airframe parts (10,12) are interconnected by said first circumferential section (14;18) of each of said tubular airframe part (10,12) extending into said second circumferential section (16;18) of the respective other tubular airframe part (12 and 10), and
    (c) said circumferential sections (14;16, 18;20) are provided with radial bores (22,24) for connection screws.

2. A tube connection as claimed in claim 1, wherein arcuate elements (26,28) having threaded bores (30) are arranged inside said thus interconnected circumferential sections (14;20, 18;16), said threaded bores (30) being aligned with said radial bores (22,24) of said circumferential sections (14;20, 18;16).

3. A tube connection as claimed in claim 2, wherein
    (a) each of said circumferential sections (14;16, 18;20) extends through an angle of substantially 180°,
    (b) said end portions of said tubular airframe parts (10,12) to be connected are of substantially identical shape and
    (c) said end portions are interconnected with corresponding ones of said circumferential sections (14;16, 18;20) mutually angularly offset by 180°.

4. A tube connection as claimed in claim 3, wherein
    (a) each of said end portions of said tubular airframe parts (10,12) comprises said first circumferential section (14 and 18, respectively) having, circumferentially, a first end and a second end, and said second circumferential section (16 and 20, respectively) having, circumferentially, a first end and a second end,
    (b) said first end of said first circumferential section (14 and 18, respectively) of each of said tubular airframe parts (10,12) is adjacent said second end of said second circumferential section (16 and 20, respectively),
    (c) said second end of said first circumferential section (14 and 18, respectively) of each of said tubular airframe parts (10,12) is adjacent said first end of said second circumferential section (16 and 20, respectively),
    (d) an axially extending slot is defined between each of said first ends of said first circumferential sections (14 and 18, respectively) and said adjacent second ends of said second circumferential sections (16 and 20, respectively),
    (e) radial step portions interconnect said second ends of said first circumferential sections (14 and 18, respectively) and said adjacent first ends of said second circumferential sections (16 and 20, respectively),
    (f) said radial step portions (38) extending through said longitudinally extending slots (32 or 34, respectively), when said tubular airframe parts are connected.

5. A tube connection as claimed in claim 4, wherein each of said end portions of said tubular airframe parts has one longitudinally extending slot (32,34) and one radial step portion (38) diametrically opposite thereto.

6. A tube connection as claimed in claim 5, wherein said arcuate elements (26,28) each extend through approximately 180°.

7. A tube connection as claimed in claim 6, wherein each of said arcuate elements (26,28) extends through the angular range of one pair of said interconnected circumferential sections (14;16, 18;20).

8. A tube connection as claimed in claim 1, wherein said second circumferential sections (16;20) have counterbores (40) for accommodating screw heads (42) in the outer surface, said counterbores (40) communicating with said radial bores (24).

9. A tube connection for connecting two tubular airframe parts of a missile, wherein
    (a) each of said tubular airframe parts (10,12) has an end portion to be connected to an end portion of the respective other tubular airframe part (10 and 12, respectively), each of said end portions having a first and a second circumferential section (14;18 and 16;20, respectively) with inner and outer diameters, said first circumferential section (14;18) having a smaller outer diameter than said second circumferential section (16;20), said outer diameter of said circumferential section (14;18), less a connection tolerance, being equal to said inner diameter of said second circumferential section (16;18),
    (b) said tubular airframe parts (10,12) are interconnected by said first circumferential section (14;18) of each of said tubular airframe part (10,12) extending into said circumferential section (16;18) of the respective other tubular airframe part (12 and 10), (c) said circumferential sections (14;16, 18;20) are provided with radial bores (22,24) for connection screws, (d) each of said circumferential sections (14;16, 18;20) extends through an angle of substantially 180°, (e) said end portions of said tubular airframe parts (10,12) to be connected are of substantially identical shape and (f) said end portions are interconnected with corresponding ones of said circumferential sections (14;16, 18;20) mutually angularly offset by 180°.

10. A tube connection as claimed in claim 9, wherein (a) each of said end portions of said tubular airframe parts (10,12) comprises said first circumferential section (14 and 18, respectively) having, circumferentially, a first end and a second end, and said second circumferential section (16 and 20, respectively) having, circumferentially, a first end and a second end, (b) said first end of said first circumferential section (14 and 18, respectively) of each of said tubular airframe parts (10,12) is adjacent said second end of said second circumferential section (16 and 20, respectively), (c) said second end of said first circumferential section (14 and 18, respectively) of each of said tubular airframe parts (10,12) is adjacent said first end of said second circumferential section (16 and 20, respectively), (d) an axially extending slot is defined between each of said first ends of said first circumferential sections (14 and 18, respectively) and said adjacent second ends of said second circumferential sections (16 and 20, respectively), (e) radial step portions interconnect said second ends of said first circumferential sections (14 and 18, respectively) and said adjacent first ends of said second circumferential sections (16 and 20, respectively), (f) said radial step portions (38) extending through said longitudinally extending slots (32 or 34, respectively), when said tubular airframe parts are connected.

11. A tube connection as claimed in claim 10, wherein each of said end portions of said tubular airframe parts has one longitudinally extending slot (32,24) and one radial step portion (38) diametrically opposite thereto.

12. A tube connection as claimed in claim 11, wherein said second circumferential sections (16;20) have counterbores (40) for accommodating screw heads (42) in the outer surface, said counterbores (40) communicating with said radial bores (24).

* * * * *